(12) United States Patent
Liu et al.

(10) Patent No.: US 10,514,487 B2
(45) Date of Patent: Dec. 24, 2019

(54) LIGHT GUIDES

(71) Applicant: 3M INNOVATIVE PROPERTIES COMPANY, St. Paul, MN (US)

(72) Inventors: Tao Liu, Woodbury, MN (US); Brian W. Ostlie, Hudson, WI (US); Brent A. Hedding, Hudson, WI (US); David C. Mercord, Prescott, WI (US); Bradley J. Johanson, Chisago City, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/774,705

(22) PCT Filed: Dec. 6, 2016

(86) PCT No.: PCT/US2016/065072
§ 371 (c)(1),
(2) Date: May 9, 2018

(87) PCT Pub. No.: WO2017/105912
PCT Pub. Date: Jun. 22, 2017

(65) Prior Publication Data
US 2018/0329128 A1 Nov. 15, 2018

Related U.S. Application Data

(60) Provisional application No. 62/268,746, filed on Dec. 17, 2015.

(51) Int. Cl.
*F21V 8/00* (2006.01)
(52) U.S. Cl.
CPC ........... *G02B 6/001* (2013.01); *G02B 6/0006* (2013.01); *G02B 6/0028* (2013.01); *G02B 6/0068* (2013.01); *G02B 6/0073* (2013.01)

(58) Field of Classification Search
CPC ........ G02B 6/0006–001; G02B 6/4298; G02B 6/078; G02B 6/02042; G02B 6/2821; F21V 2200/00–40
See application file for complete search history.

(56) References Cited

U.S. PATENT DOCUMENTS 3,610,729 A 10/1971 Rogers
4,446,305 A 5/1984 Rogers et al.
(Continued)

FOREIGN PATENT DOCUMENTS

CN 203535254 4/2014
DE 10 2012 004446 9/2013
(Continued)

OTHER PUBLICATIONS

PCT International Search Report from PCT/US2016/065072, dated Mar. 17, 2017, 5 pages.
U.S. Appl. No. 62/202,373, filed Aug. 7, 2015.

*Primary Examiner* — Mariceli Santiago
(74) *Attorney, Agent, or Firm* — Jonathan L. Tolstedt

(57) ABSTRACT

Light guide assemblies including first, second and third light guides, a first optical coupling component disposed between and attached to the first and second light guides, and a second optical coupling component disposed between and attached to the second and third light guides are described. The first optical coupling component is adapted to couple light between the first and second light guides, and the second optical coupling component is adapted to couple light the between second and third light guides. The first light guide, the second light guide and the first optical coupling component are coextensive over a first region of the assembly, and the second light guide, the third light guide and the second optical coupling component are coextensive over a different second region of the assembly.

20 Claims, 12 Drawing Sheets

(56) References Cited

U.S. PATENT DOCUMENTS

| | | | |
|---|---|---|---|
| 4,540,623 A | 9/1985 | Im et al. | |
| 4,812,219 A | 3/1989 | Sattrup et al. | |
| 5,448,404 A | 9/1995 | Schrenk et al. | |
| 5,845,025 A * | 12/1998 | Garito | C08G 73/0672 |
| | | | 385/50 |
| 5,882,774 A | 3/1999 | Jonza et al. | |
| 6,951,401 B2 * | 10/2005 | Van Hees | G02B 6/0031 |
| | | | 362/555 |
| 9,242,594 B2 * | 1/2016 | Nakada | G02B 6/002 |
| 9,939,123 B2 * | 4/2018 | Nakada | B60Q 1/2607 |
| 2003/0006230 A1 | 1/2003 | Kaji et al. | |
| 2007/0116424 A1 * | 5/2007 | Ting | G02B 6/0021 |
| | | | 385/147 |
| 2008/0074898 A1 | 3/2008 | Sommer et al. | |
| 2009/0003784 A1 * | 1/2009 | Kabuki | B41J 2/45 |
| | | | 385/119 |
| 2012/0081920 A1 | 4/2012 | Ie et al. | |
| 2012/0133861 A1 | 5/2012 | Ren et al. | |
| 2013/0286630 A1 | 10/2013 | Guiset et al. | |
| 2016/0193954 A1 * | 7/2016 | Nakada | F21S 43/14 |
| | | | 362/511 |

FOREIGN PATENT DOCUMENTS

| | | | | |
|---|---|---|---|---|
| EP | 2500754 A1 * | 9/2012 | | G02B 6/0076 |
| WO | WO 2007/034397 | 3/2007 | | |
| WO | WO 2011-130718 | 10/2011 | | |
| WO | WO 2013/191690 | 12/2013 | | |
| WO | WO-2017027215 A1 * | 2/2017 | | G02B 6/001 |

* cited by examiner

LIGHT GUIDES

BACKGROUND

A light guide may include light extraction features disposed to extract light from a side of the light guide. Such light guides may be used for illumination in various applications such as strip and panel lighting.

SUMMARY

In some aspects of the present description, an article including first, second and third light guides, a first optical coupling component disposed between and attached to the first and second light guides and adapted to couple light between the first and second light guides, and a second optical coupling component disposed between and attached to the second and third light guides and adapted to couple light between the second and third light guides is provided. The first light guide, the second light guide and the first optical coupling component are coextensive over a first region of the article extending along a first portion of a length of the article, and the first portion has a length between about 20 percent and 80 percent of the length of the article. The second light guide, the third light guide and the second optical coupling component are coextensive over a different second region of the article extending along a second portion of the length of the article, and the second portion has a length between about 20 percent and 80 percent of the length of the article. The second portion of the length is at most partially coextensive with the first portion of the length. The second light guide includes a light extractor configured to extract light from the article through a side of the second light guide.

In some aspects of the present description, an optical system including first, second and third light guides is provided. The first, second and third light guides each have a first end disposed adjacent a first end of the optical system and a second end disposed adjacent an opposite second end of the optical system. The second light guide including a light extractor configured to extract light from the optical system through a side of the second light guide. A first optical coupling component is disposed between and attached to the first and second light guides and adapted to couple light between the first and second light guides. A second optical coupling component is disposed between and attached to the second and third light guides and adapted to couple light between the second and third light guides. A first light source disposed to inject light into the first end of the first light guide, and a second light source disposed to inject light into the second end of the third light guide. The optical system is configured such that light from the first light source is substantially uniformly extracted primarily from a first portion of the second light guide adjacent the second end of the second light guide, and light from the second light source is substantially uniformly extracted primarily from a second portion of the second light guide disposed between the first portion of the second light guide and the first end of the second light guide and at most partially overlapping with the first portion of the second light guide. Each of the first and second portions of the second light guide have a length of at least 20 percent of a length of the second light guide.

In some aspects of the present description, a monolithic light pipe extending along a length of the light pipe between opposing first and second end faces and comprising non-overlapping first and second portions, each portion having a length of at least 20 percent of a length of the monolithic light pipe, is provided. The light pipe includes a first optical coupling component disposed between the first and second end faces configured to couple light into the light pipe, and the light pipe includes a different second optical coupling component between the first and second end faces configured to couple light into the light pipe. The light pipe is configured such that light coupled into the light pipe through the first optical coupling component is substantially uniformly extracted primarily from the first portion of the light pipe and light coupled into the light pipe through the second optical coupling component is substantially uniformly extracted primarily from the second portion of the light pipe.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Light guides utilized for illumination may include a light extractor for extracting light from a side of the light guide and may include an input end or opposing input ends which may accept light input from one or more light sources. The light extractor may include a plurality of discrete spaced apart light extraction features which may be arranged to provide a uniform illumination of one or more target areas. However, it may be difficult to choose a distribution of light extraction features to produce an entirely uniform illumination intensity at the target area. Furthermore, it may be desired to be able to independently control the illumination in two or more target areas. According to the present description, it has been discovered that utilizing three light guides with optical coupling components between adjacent light guides can provide a more uniform illumination in two target areas. For example, a light guide article or assembly may include first, second and third light guides with a first optical coupling component disposed between and attached to the first and second light guides and a second optical coupling component disposed between and attached to the second and third light guides. The first light guide may accept light input from a first light source (e.g., one or more light emitting diodes (LEDs)) at a first end of the light guide assembly and the third light guide may accept light input from a second light source at an opposite second end of the light guide assembly. The second light guide receives light input from the first and third light guides through the first and second optical coupling components. The second light guide includes a light extractor that extracts light from the assembly through a side of the second light guide. The first optical coupling component and the light extractor may be configured such that light from the first light source is extracted substantially uniformly primarily from a first portion of the second light guide, and the second optical coupling component and the light extractor may be configured such that light from the second light source is extracted substantially uniformly primarily from a different second portion of the second light guide.

Figure 1:
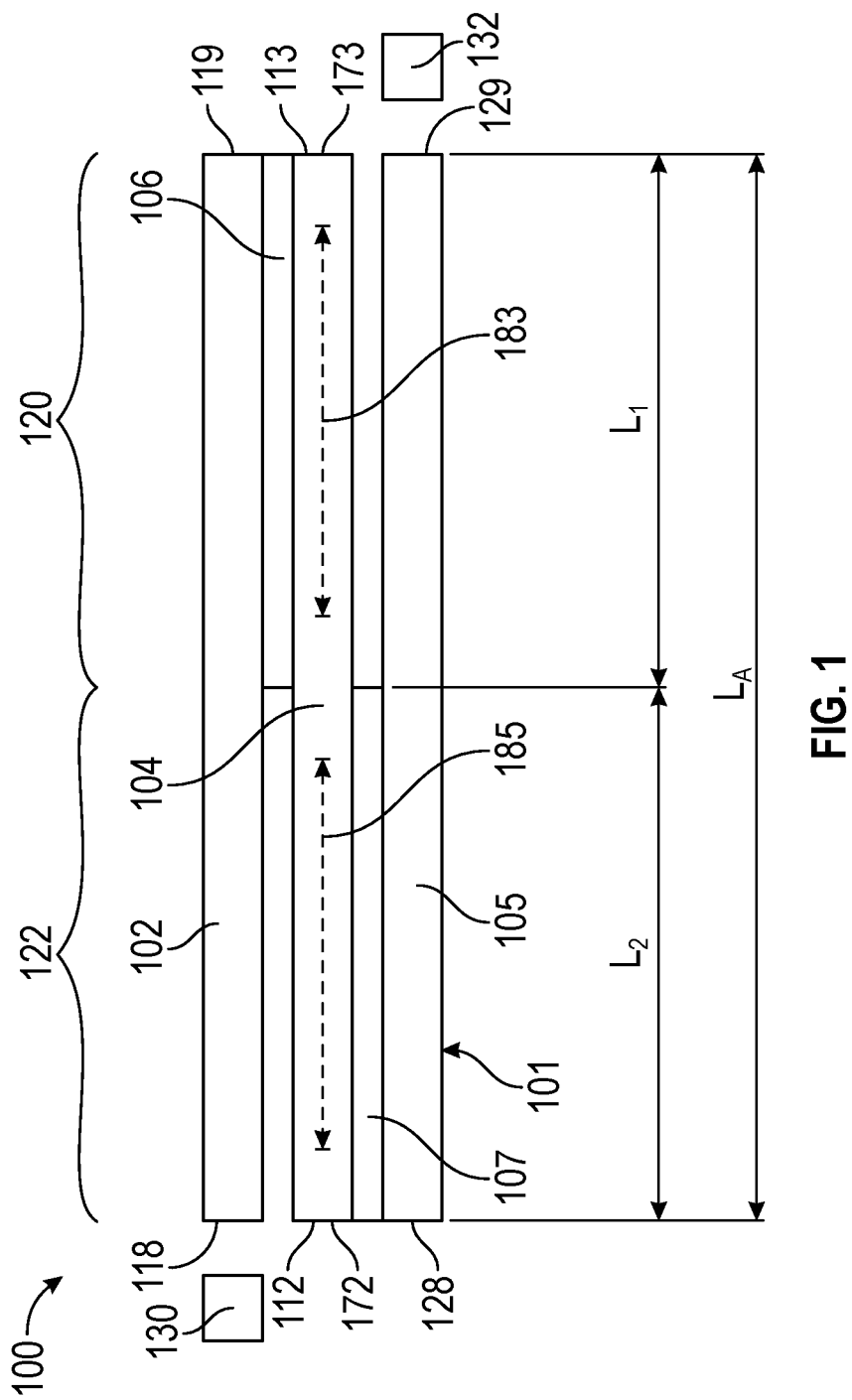
FIG. 1 is a schematic top view of an optical system including a light guide assembly.

FIG. 1 is a schematic top view of optical system 100 which includes light guide assembly or article 101 and first and second light sources 130 and 132. Light guide article 101 includes first, second and third light guides 102, 104 and 105, and includes first and second optical coupling components 106 and 107.

First optical coupling component 106 is disposed between and attached to the first and second light guides 102 and 104 and is adapted to couple light between the first and second light guides 102 and 104. Second optical coupling component 107 is disposed between and attached to the second and third light guides 104 and 105 and is adapted to couple light between the second and third light guides 104 and 105. The first light guide 102, the second light guide 104 and the first optical coupling component 106 are coextensive over a first region 120 of the article 101 extending along a first portion (having length $L_1$) of a length ($L_A$) of the article 101. The second light guide 104, the third light guide 105 and the second optical coupling component 107 are coextensive over a second region 122 of the article 101 extending along a second portion (having length $L_2$) of the length of the article 101. The second portion of the length is at most partially coextensive with the first portion of the length. For example, there may be substantially no overlap of the first and second portions of the length as illustrated in FIG. 1, or the first and second portions of the length may be coextensive in an overlap region as described further elsewhere herein. Each of lengths $L_1$ and $L_2$ may be between about 20 percent and about 80 percent, or between about 30 percent and about 70 percent, or between about 40 percent and about 60 percent of the length $L_A$ of the article 100.

As described further elsewhere herein, the second light guide 104 includes a light extractor configured to extract light from the article 100 through a side of the second light guide 104. The light extractor may be disposed at least partially in the first and second regions 120 and 122.

The first, second and third light guides 102, 104 and 105 each have a first end (118, 112 and 128, respectively) disposed adjacent a first end 172 of the article 101 and a second end (119, 113 and 129, respectively) disposed adjacent an opposite second end 173 of the article 101. The first light source 130 is disposed to inject light into the first end 118 of the first light guide 102, and the second light source 132 is disposed to inject light into the second end 129 of the third light guide 105. In some embodiments, light from the first light source 130 is substantially uniformly extracted primarily from a first portion 183 of the second light guide 104 adjacent the second end 113 of the second light guide 104. In some embodiments, light from the second light source 132 is substantially uniformly extracted primarily from a second portion 185 of the second light guide 104 disposed between the first portion 183 of the second light guide 104 and the first end 112 of the second light guide 104.

In some embodiments, each of the first and second portions 183 and 185 of the second light guide 104 have a length of at least 30% of a length of the second light guide 104. In some embodiments, the length of the first portion 183 may be at least 50%, or at least 70%, or at least 80%, or at least 90% of the length $L_1$ of the first region 120. In some embodiments, the length of the first portion 183 may be substantially equal to the length $L_1$ of the first region 120. In some embodiments, the length of the second portion 185 may be at least 50%, or at least 70%, or at least 80%, or at least 90% of the length L2 of the second region 122. In some embodiments, the length of the second portion 185 may be substantially equal to the length L2 of the second region 122. In some embodiments, the first portion 183 of the second light guide 104 is substantially coextensive with the first optical coupling component 106 and the second portion 185 of the second light guide 104 is substantially coextensive with the second optical coupling component 107. The first and second portions 183 and 185 may be substantially non-overlapping or at most partially overlapping. Each of lengths of the first and second portions 183 and 185 may be between about 20 percent and about 80 percent, or between about 30 percent and about 70 percent, or between about 40 percent and about 60 percent of a length of the second light guide 104 which may be substantially equal to the length $L_A$ of the article 101. Each of lengths of the first and second portions 183 and 185 may be approximately 50 percent of the length of the second light guide 104.

In some embodiments, the light from the first light source 130 that is extracted from the second light guide 104 has a total luminous energy and no more than 40 percent, or no more than 30 percent, or no more that 20 percent, or no more than 10 percent of the total luminous energy is extracted from the second portion 185 of the second light guide 104. Similarly, in some embodiments, the light from the second light source 132 that is extracted from the second light guide 104 has a total luminous energy and no more than 40 percent, or no more than 30 percent, or no more that 20 percent, or no more than 10 percent of the total luminous energy is extracted from the first portion 183 of the second light guide 104. In some embodiments, the light from the first light source 130 that is extracted from the first portion 183 of the second light guide 104 has a luminance that varies by less than 50 percent, or less than 40 percent, or less than 30 percent, or less than 20 percent, or less than 10 percent along the length of the first portion 183 of the second light guide 104. Similarly, in some embodiments, the light from the second light source 132 that is extracted from the second portion 185 of the second light guide 104 has a luminance that varies by less than 50 percent, or less than 40 percent, or less than 30 percent, or less than 20 percent, or less than 10 percent along the length of the second portion 185 of the second light guide 104.

The luminance of light emitted from a portion of a light guide can be determined by using a suitable photometer (such as those available from Radiant Vision Systems, LLC, Redmond, Wash.) positioned so that it can receive light from the entire portion. The variation in luminance from the portion of the light guide can be understood to be a maximum luminance from the portion minus a minimum luminance from the portion divided by the maximum luminance times 100 percent. For example, a portion of a light guide may produce a maximum luminance four times as large as a minimum luminance. In this case the variation in luminance along the portion is 75 percent. As another example, a portion of a light guide may produce a minimum luminance half as large as a maximum luminance. In this case the variation in luminance along the portion is 50 percent. In some applications, a variation in luminance of 75 percent may be undesired, while a luminance variation of 50 percent may be acceptable. Light may be said to be substantially uniformly extracted from a portion of a light guide if the variation in luminance along a length of the portion is no greater than 50 percent.

In some embodiments, second light guide 104 and first and second optical coupling components 106 and 107 are monolithic and may be described as a monolithic light pipe. In some embodiments, light guide article 101 is monolithic. As described further elsewhere herein, a monolithic light guide article can be made, for example, via molding or via extrusion with post-processing steps to form the light extractor and optical coupling components.

Figure 2:
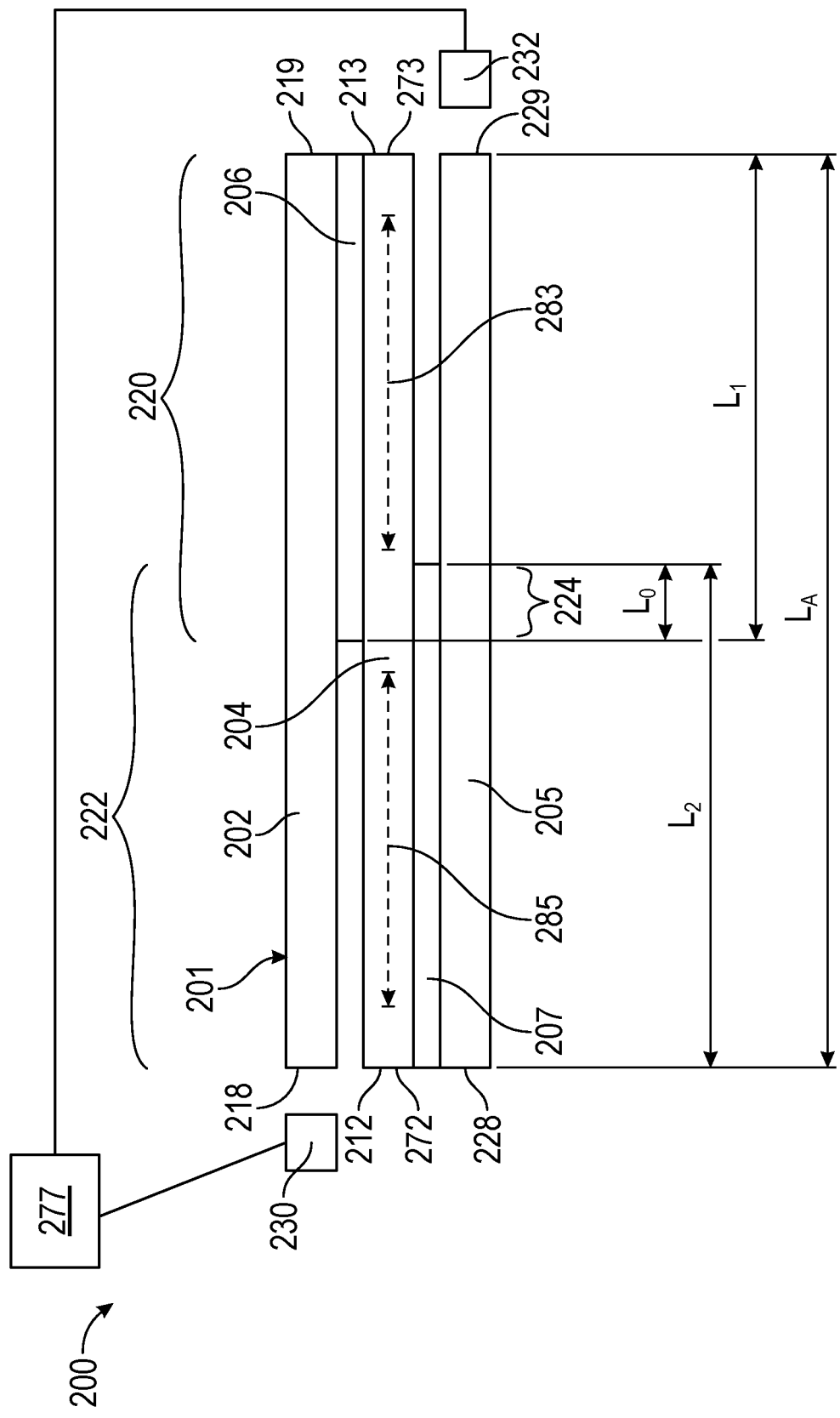
FIG. 2 is a schematic top view of an optical system including a light guide assembly.

FIG. 2 is a schematic top view of optical system 200 which includes light guide article 201 and first and second light sources 230 and 232. Light guide article 201 includes first, second and third light guides 202, 204 and 205, and includes first and second optical coupling components 206 and 207.

First optical coupling component 206 is disposed between and attached to the first and second light guides 202 and 204 and is adapted to couple light between the first and second light guides 202 and 204. Second optical coupling component 207 is disposed between and attached to the second and third light guides 204 and 305 and is adapted to couple light between the second and third light guides 204 and 205. The first light guide 202, the second light guide 204 and the first optical coupling component 206 are coextensive over a first region 220 of the article 201 extending along a first portion (having length $L_1$) of a length ($L_A$) of the article 201. The second light guide 204, the third light guide 205 and the second optical coupling component 207 are coextensive over a second region 222 of the article 201 extending along a second portion (having length L2) of the length of the article 201. The second portion of the length is at most partially coextensive with the first portion of the length. The first and second portions of the length are coextensive in an overlap region 224 which extends along a third portion of the article 201 having a length $L_o$. In some embodiments, the length $L_o$ of the overlap region is less than half, or less than 40 percent, or less than 30 percent, or less than 20 percent, or less than 10 percent, of the length $L_1$ of the first portion. Each of lengths $L_1$ and $L_2$ may be between about 20 percent and about 80 percent, or between about 30 percent and about 70 percent, or between about 40 percent and about 60 percent of the length $L_A$ of the article 200.

As described further elsewhere herein, the second light guide 204 includes a light extractor configured to extract light from the article 200 through a side of the second light guide 204. The light extractor may be disposed at least partially in the first and second regions 220 and 222.

The first, second and third light guides 202, 204 and 205 each have a first end (218, 212 and 228, respectively) disposed adjacent a first end 272 of the article 201 and a second end (219, 213 and 229, respectively) disposed adjacent an opposite second end 273 of the article 201. The first light source 230 is disposed to inject light into the first end 218 of the first light guide 202, and the second light source 232 is disposed to inject light into the second end 229 of the third light guide 205. In some embodiments, light from the first light source 230 is substantially uniformly extracted primarily from a first portion 283 of the second light guide 204 adjacent the second end 213 of the second light guide 204. In some embodiments, light from the second light source 232 is substantially uniformly extracted primarily from a second portion 285 of the second light guide 204 disposed between the first portion 283 of the second light guide 204 and the first end 212 of the second light guide 204.

In some embodiments, each of the first and second portions 283 and 285 of the second light guide 204 have a length of at least 30% of a length of the second light guide 204. In some embodiments, the first and second portions 283 and 285 may overlap in the overlap region 224, while in other embodiments, the first and second portions 283 and 285 may include only portions of the article 201 outside the overlap regions 224. In some embodiments, the length of the first portion 283 may be at least 50%, or at least 70%, or at least 80%, or at least 90% of the length $L_1$ of the first region 120. In some embodiments, the length of the first portion 283 may be substantially equal to the length $L_1$ of the first region 220. In some embodiments, the length of the second portion 285 may be at least 50%, or at least 70%, or at least 80%, or at least 90% of the length $L_2$ of the second region 222. In some embodiments, the length of the second portion 285 may be substantially equal to the length $L_2$ of the second region 222. In some embodiments, the first portion 283 of the second light guide 204 is substantially coextensive with the first optical coupling component 206 and the second portion 285 of the second light guide 204 is substantially coextensive with the second optical coupling component 207. The first and second portions 283 and 285 may be substantially non-overlapping or at most partially overlapping. Each of the lengths of the first and second portions 283 and 285 may be between about 20 percent and about 80 percent, or between about 30 percent and about 70 percent, or between about 40 percent and about 60 percent of a length of the second light guide 204 which may be substantially equal to the length $L_A$ of the article 201. Each of lengths of the first and second portions 283 and 285 may be about 50 percent of the length of the second light guide 204.

In some embodiments, the light from the first light source 230 that is extracted from the second light guide 204 has a total luminous energy and no more than 40 percent, or no more than 30 percent, or no more that 20 percent, or no more than 10 percent of the total luminous energy is extracted from the second portion 285 of the second light guide 204. Similarly, in some embodiments, the light from the second light source 232 that is extracted from the second light guide 204 has a total luminous energy and no more than 40 percent, or no more than 30 percent, or no more that 20 percent, or no more than 10 percent of the total luminous energy is extracted from the first portion 283 of the second light guide 204. In some embodiments, the light from the first light source 230 that is extracted from the first portion 283 of the second light guide 204 has a luminosity that varies by less than 40 percent, or less than 30 percent, or less than 20 percent, or less than 10 percent along the length of the first portion 283 of the second light guide 204. Similarly, in some embodiments, the light from the second light source 232 that is extracted from the second portion 285 of the second light guide 204 has a luminosity that varies by less than 40 percent, or less than 30 percent, or less than 20 percent, or less than 10 percent along the length of the second portion 285 of the second light guide 204.

In some embodiments, second light guide 204 and first and second optical coupling components 206 and 207 are monolithic and may be described as a monolithic light pipe. In some embodiments, light guide article 201 is monolithic.

Optical system 200 includes a controller 277 adapted to independently control the first and second light sources 230 and 232. In some embodiments, light from the first light source 230 has a first color and light from the second light source 232 has a different second color. In some embodiments, the optical system 200 is configured to extract a third color different from the first and second colors from the overlap region 224. For example, the first light source 230 may provide a blue light, the second light source 232 may provide a yellow light, and a green light (a blend of blue and yellow) may be extracted from the overlap region 224. The controller 277 may have a plurality of different modes, such as a mode in which both light sources are activated, a mode in which one but not the other light source is activated, and a mode in which the controller 277 is adapted to alternately turn on and off the first and second light sources 230 and 232.

Figure 3:
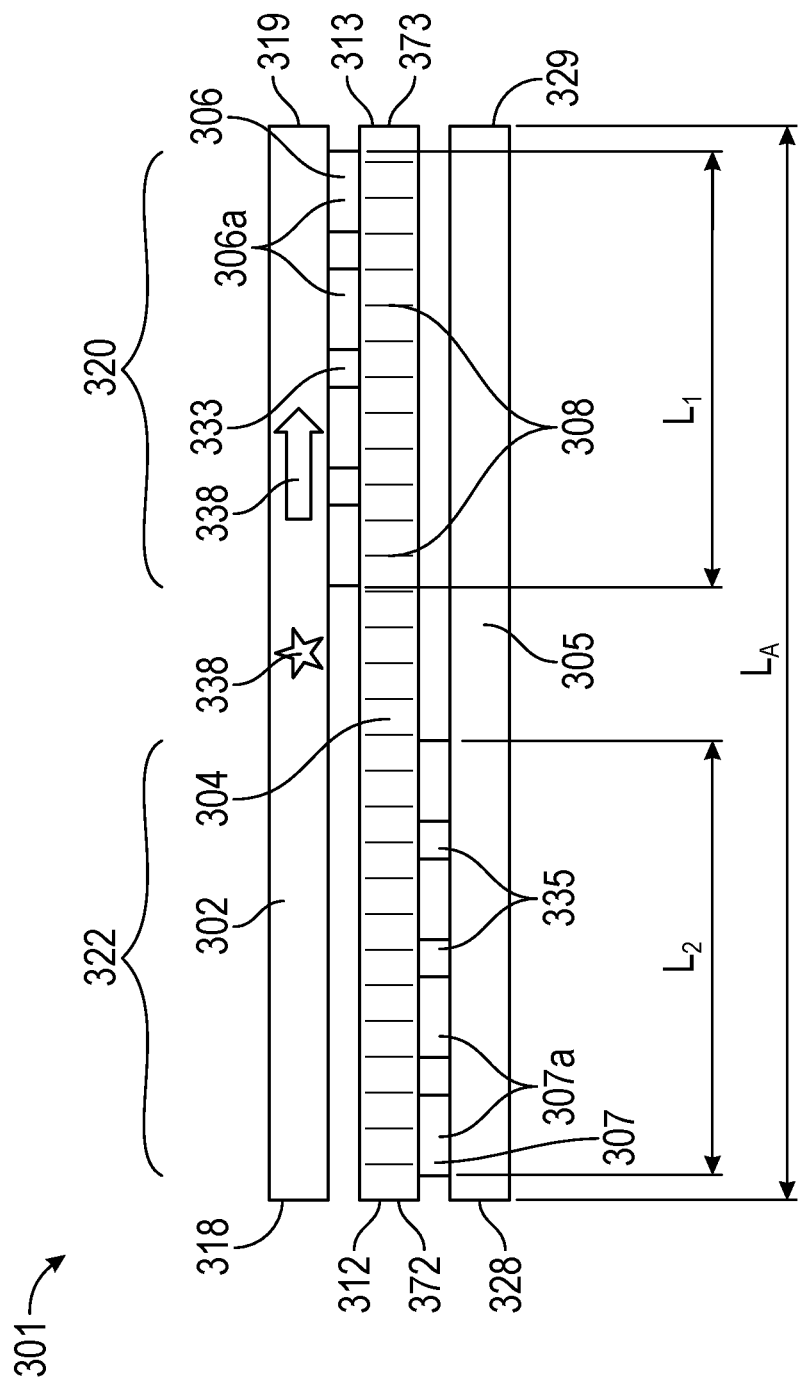
FIG. 3 is a schematic top view of a light guide assembly.

FIG. 3 is a schematic top view of light guide article 301 including first, second and third light guides 302, 304, and 305 which each have a first end 318, 312 and 328, respectively, adjacent a first end 372 of the article 301 and a second end 319, 313 and 329, respectively, adjacent a second end 373 of the article 301. A first optical coupling component 306 is disposed between and attached to the first and second light guides 302 and 304 and a second optical coupling component 307 is disposed between and attached to the second and third light guides 304 and 305. The first and second optical coupling components 306 and 307 and the second light guide 304 may be monolithic and may be described as a monolithic light pipe. First light guide 302 and first optical coupling component 306 may be monolithic, third light guide 305 and second optical coupling component 307 may be monolithic, and article 301 may be monolithic. First optical coupling component 306 includes a plurality of regions 306a adapted to optically couple first and second light guides 302 and 304 and defines a plurality of regions 333 adapted to prevent optical coupling. Similarly, second optical coupling component 307 includes a plurality of regions 307a adapted to optically couple second and third light guides 302 and 304 and defines a plurality of regions 335 adapted to prevent optical coupling.

First optical coupling component 306 is disposed between and attached to the first and second light guides 302 and 304 and is adapted to couple light between the first and second light guides 302 and 304. Second optical coupling component 307 is disposed between and attached to the second and third light guides 304 and 305 and is adapted to couple light between the second and third light guides 304 and 305. The first light guide 302, the second light guide 304 and the first optical coupling component 306 are coextensive over a first region 320 of the article 301 extending along a first portion (having length $L_1$) of a length ($L_A$) of the article 301. The second light guide 304, the third light guide 305 and the second optical coupling component 307 are coextensive over a second region 322 of the article 301 extending along a second portion (having length $L_2$) of the length of the article 301. The second portion of the length is at most partially coextensive with the first portion of the length.

In some embodiments, a first light source is disposed to inject light into first end 318 of the first light guide 302 and a second light source is disposed to inject light into second end 329 of the third light guide 305. In some embodiments, light from the first light source is substantially uniformly extracted primarily from a first portion of the second light guide 304 adjacent the second end 313 of the second light guide 304, as described further elsewhere herein (see, e.g., the discussion in connection with FIGS. 1 and 2). In some embodiments, light from the second light source is substantially uniformly extracted primarily from a second portion of the second light guide 304 disposed between the first portion of the second light guide 304 and the first end 312 of the second light guide 304, as described elsewhere herein (see, e.g., the discussion in connection with FIGS. 1 and 2).

Figure 6:
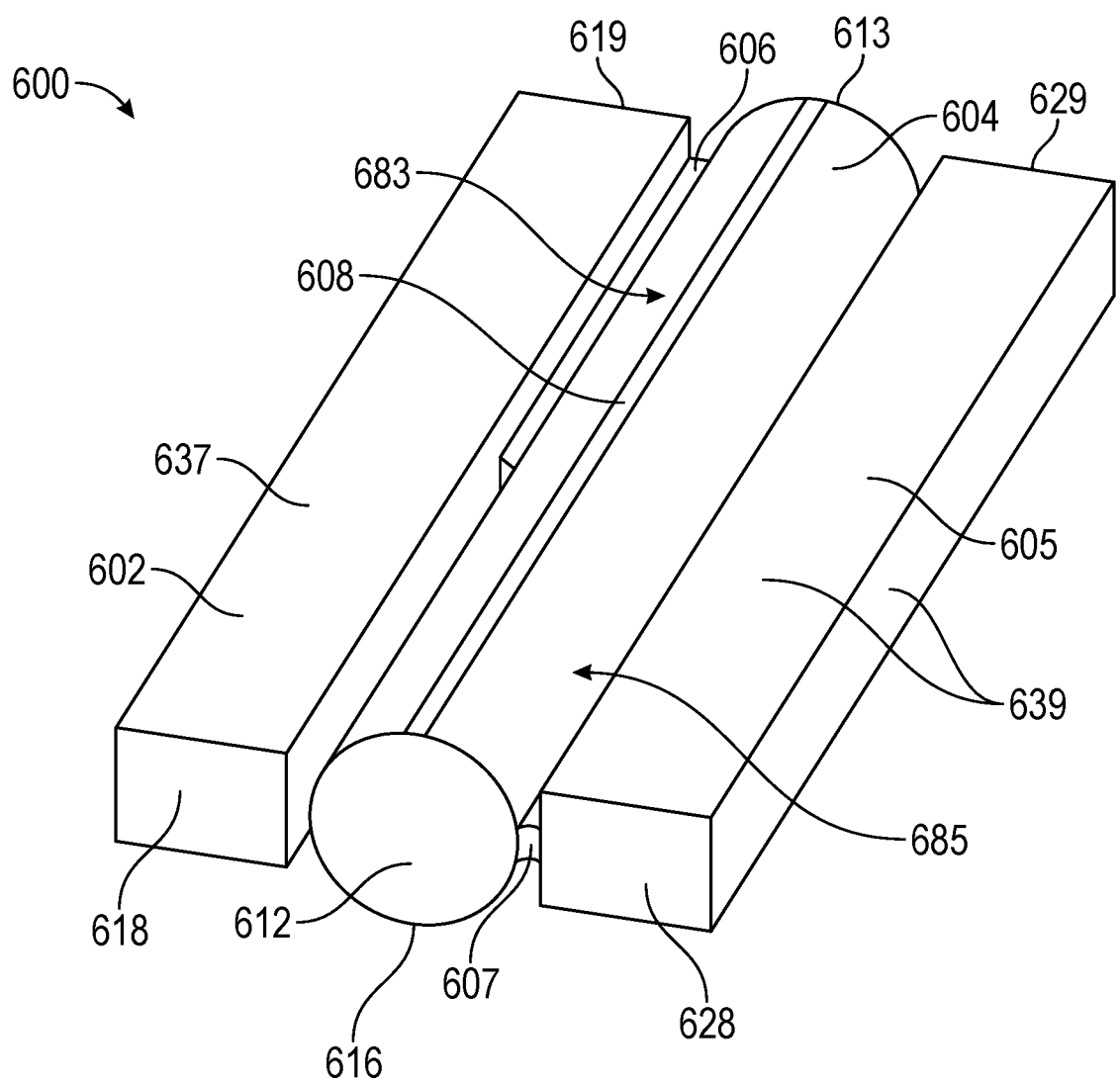
FIG. 6 is a perspective view of a light guide assembly.
Figure 7:
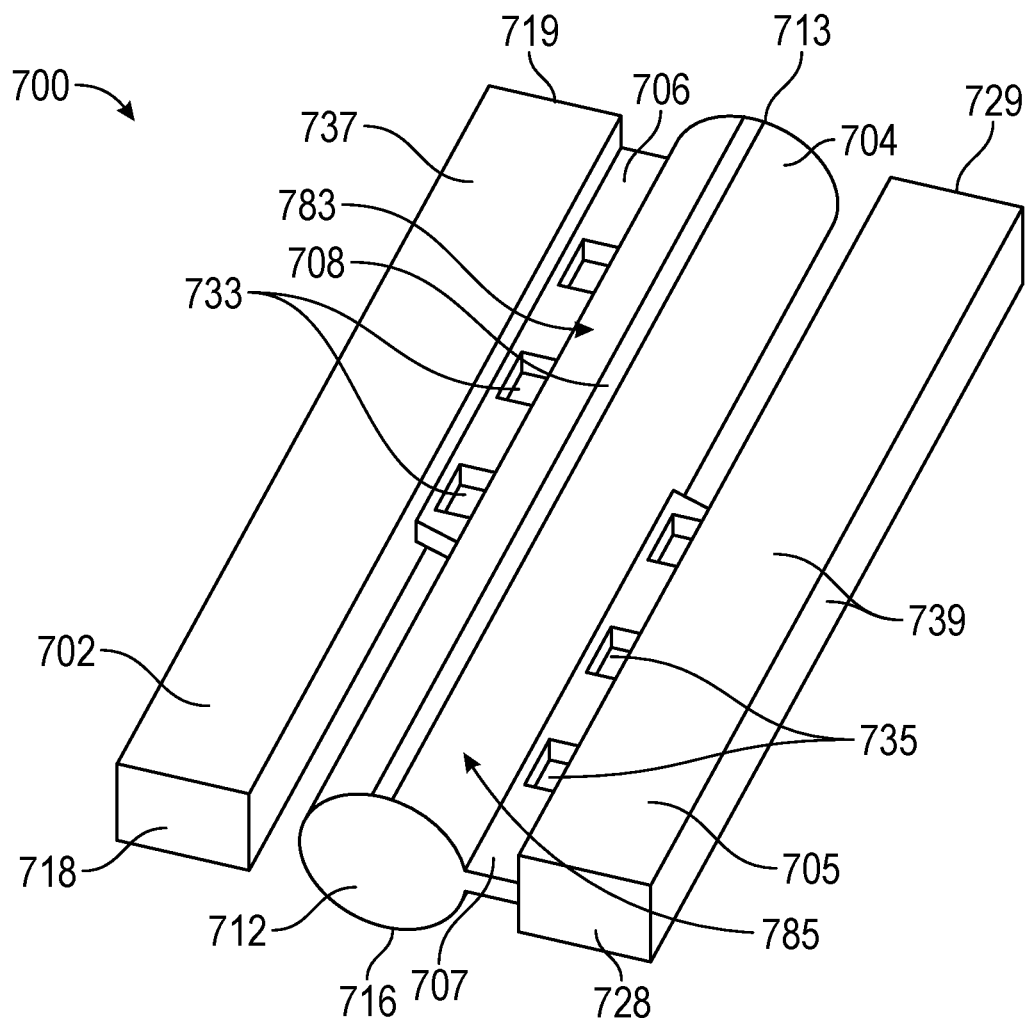
FIG. 7 is a perspective view of a light guide assembly.

The second light guide 304 includes a light extractor 308 configured to extract light from the article 301 through a side (e.g., a bottom surface of the second light guide 304 opposite the top surface visible in FIG. 3) of the second light guide 304. The light extractor 308 includes a plurality of discrete spaced apart features (e.g., notches) adapted to extract light from an opposite side of the second light guide 304. In other embodiments, the light extractor 308 may be a continuous diffuser (e.g., a diffusive strip as illustrated in FIGS. 6-7), for example.

First light guide 302 includes light extractors 338 which in the illustrated embodiment are each continuous or substantially continuous. In other embodiments, light extractors 338 may each be discontinuous and may include discrete spaced apart light extraction features as described elsewhere herein. Light extractors 338 are adapted to illuminate one or more indicia at a surface of the first light guide 302. In the illustrated embodiment, the one or more indicia includes two indicia; a star and an arrow. In other embodiments, one, two, or more than two indicia may be included. The indicia may be or include a logo or an informational indicium (e.g., a warning sign), for example. Light extractors 338 may include continuous portions such as diffusers to illuminate each indicium or portions of each indicium, and/or may include discrete spaced apart features arranged to illuminate each indicium or portions of each indicium, for example. Light extractors 338 may be disposed on a flat surface or a flat portion of a surface of first light guide 302. Light extractors such as light extractors 338 may alternatively or in addition be included in second and/or third light guides 304 and 305.

Figure 4:
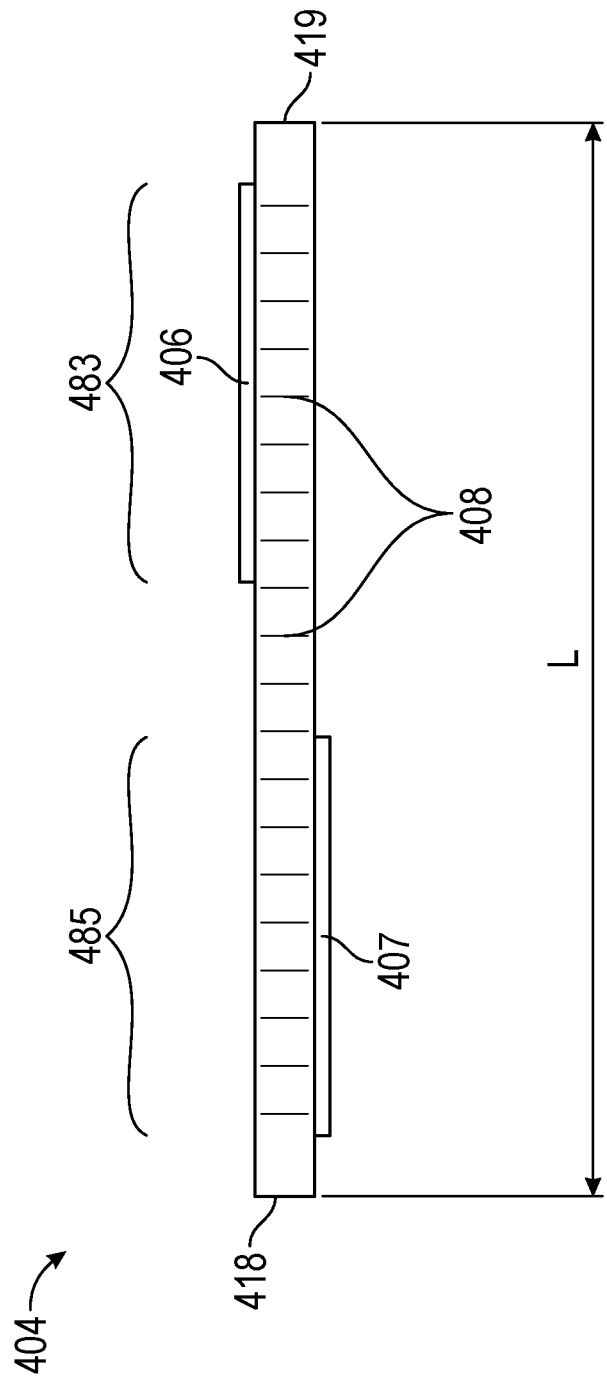
FIG. 4 is a schematic top view of a light pipe.

FIG. 4 is a schematic top view of monolithic light pipe 404 which extends along a length L of the light pipe 404 between opposing first and second end faces 418 and 419, and include non-overlapping first and second portions 483 and 485, each portion having a length of at least 20 percent of the length L of the monolithic light pipe 404. Each of the lengths of the first and second portions 483 and 485 may be between about 20 percent and about 80 percent, or between about 30 percent and about 70 percent, or between about 40 percent and about 60 percent of a length of the light pipe 404. Each of lengths of the first and second portions 483 and 485 may be about 50 percent of the length of the light pipe 404. The monolithic light pipe 404 includes a first optical coupling component 406 disposed between the first and second end faces 418 and 419 and configured to couple light into the light pipe 404. The light pipe includes a different second optical coupling component 407 between the first and second end faces 418 and 419 and configured to couple light into the light pipe 404. The light pipe 404 is configured such that that light coupled into the light pipe through the first optical coupling component 406 is substantially uniformly extracted primarily from the first portion 483 of the light pipe and light coupled into the light pipe through the second optical coupling component 407 is substantially uniformly extracted primarily from the second portion 485 of the light pipe 404. Light pipe 404 includes a light extractor 408 configured to extract light from a side of the light pipe 404. Light extractor 408 may include a plurality of discrete space apart notches, for example, or may include a continuous diffuser, for example. The light extractor may be disposed at least partially in the first and second portions 483 and 485.

Figure 5:
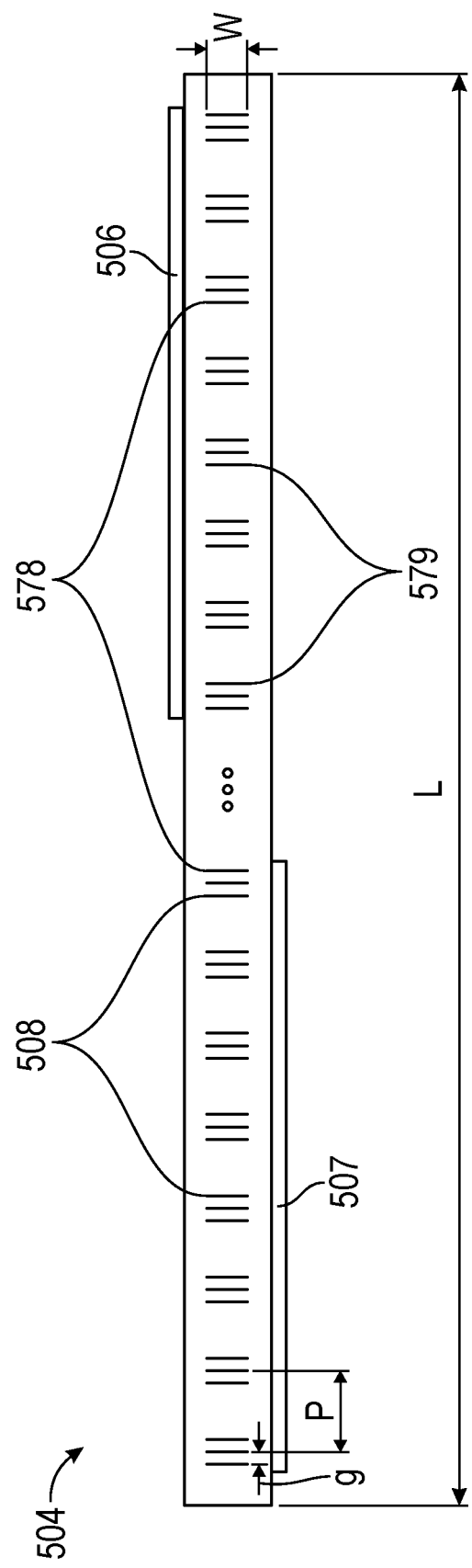
FIG. 5 is a schematic top view of a light pipe.

FIG. 5 is a schematic top view of monolithic light pipe 504, which has a length L and which includes a light extractor 508 and first and second optical coupling components 506 and 507. Monolithic light pipe 504 may correspond to monolithic light pipe 404 except for the light extractor 508. The top surface of the monolithic light pipe includes a light extractor 508 including a plurality of triplets 578 of notches 579 with a uniform pitch, P, between adjacent triplets and a gap, g, between adjacent notches within a triplet. The notches 579 have a width W. The geometry of the first and second optical coupling components 506 and 507 may similar to that of any of the optical coupling components described elsewhere herein.

FIG. 6 is a perspective view of a light guide article 600 including a first light guide 602, a second light guide 604, a first optical coupling component 606 disposed between and attached to the first and second light guides 602 and 604, a third light guide 605, and a second optical coupling component 607 disposed between and attached to the second and third light guides 604 and 605. The first optical coupling component 606 is adapted to couple light between the first and second light guides 602 and 604, and the second optical coupling component 607 is adapted to couple light between the second and third light guides 604 and 605. In the embodiment illustrated in FIG. 6, the first, second and third light guides 602, 604 and 605 are coextensive over an entire length or over substantially the entire length of the light guide article 600. In other embodiments, the first, second and third light guides 602, 604 and 605 may have differing lengths. In some embodiments, the first and second light guides 602 and 604, and the first optical coupling component 606 are coextensive over a first region 683 of the light guide article 600 extending along a portion of a length of the light guide article 600; and the second and third light guides 604 and 605, and the second optical coupling component 607 are coextensive over a second region 685 of the light guide article 600 extending along a portion of a length of the light guide article 600. The first and second regions 683 and 685 at most partially overlap. In some embodiments, the first and second regions 683 and 685 do not overlap. As described elsewhere herein, in some embodiments, article 600 is adapted such that light injected into side 618 of first light guide 602 is substantially uniformly extracted primarily from the first region 683 and light injected into side 629 is of third light guide 605 is substantially uniformly extracted primarily from the second region 685.

Second light guide 604 includes opposing first and second ends 612 and 613 and includes light extractor 608, which may correspond to any of the light extractors described elsewhere herein. Light extractor 608 is adapted to extract light from the light guide article 600 through side 616 of the second light guide 604. First light guide 602 includes opposing first and second ends 618 and 619, and includes sides comprising one or more flat surfaces 637. Third light guide 605 includes opposing first and second ends 628 and 629, and includes sides comprising one or more flat surfaces 639. One or both of first and third light guides 602 and 605 may include light extractors adapted to extract light from the light guide article 600 through one or more of the surfaces 637 and 639. In some embodiments, such light extractors are adapted to illuminate one or more indicia at one or more of the surfaces 637 and 639.

One or more light sources may be disposed proximate one or more of the ends 612, 613, 618, 619, 628, and 629. In some embodiments, light sources are disposed proximate one or both of the first and second ends 618 and 619 of the first light guide 602, and light sources are disposed proximate one or both of the first and second ends 628 and 629 of the third light guide 605. The second light guide 604 may receive light substantially only from the first and third light guides 602 and 605 and not from any light sources disposed proximate the first and second ends 612 and 613 of the second light guide 604.

The first and second optical coupling components 606 and 607 may be continuous or discontinuous and may define one or more locations along a length of the optical coupling component adapted to prevent optical coupling between the respective adjacent light guides as illustrated in FIG. 7.

FIG. 7 is a perspective view of a light guide article 700 including a first light guide 702, a second light guide 704, a first optical coupling component 706 disposed between and attached to the first and second light guides 702 and 704, a third light guide 705, and a second optical coupling component 707 disposed between and attached to the second and third light guides 704 and 705. The first optical coupling component 706 is adapted to couple light between the first and second light guides 702 and 704, and the second optical coupling component 707 is adapted to couple light between the second and third light guides 704 and 705.

In the embodiment illustrated in FIG. 7, the first, second and third light guides 702, 704 and 705 are coextensive over an entire length or over substantially the entire length of the light guide article 700. In other embodiments, the first, second and third light guides 702, 704 and 705 may have differing lengths. In some embodiments, the first and second light guides 702 and 704, and the first optical coupling component 706 are coextensive over a first region 783 of the light guide article 700 extending along a portion of a length of the light guide article 700; and the second and third light guides 704 and 705, and the second optical coupling component 707 are coextensive over a second region 785 of the light guide article 700 extending along a portion of a length of the light guide article 700. The first and second regions 783 and 785 at most partially overlap. In some embodiments, the first and second regions 783 and 785 do not overlap. As described elsewhere herein, in some embodiments, article 700 is adapted such that light injected into side 718 of first light guide 702 is substantially uniformly extracted primarily from the first region 783 and light injected into side 729 is of third light guide 705 is substantially uniformly extracted primarily from the second region 785.

The first optical coupling component 706 defines a plurality of locations 733 along a length of the first optical coupling component 706 adapted to prevent optical coupling between the first and second light guides 702 and 704. The second optical coupling component 707 defines a plurality of locations 735 along a length of the second optical coupling component 707 adapted to prevent optical coupling between the second and third light guides 704 and 705. In some embodiments, locations 733 extend over less than about half (or less than about one third, or less than about one fourth) of the length of the optical coupling component 706 and locations 735 extend over less than about half (or less than about one third, or less than about one fourth) of the length of the optical coupling component 707.

Second light guide 704 includes opposing first and second ends 712 and 713 and includes light extractor 708, which may correspond to any of the light extractors described elsewhere herein. Light extractor 708 is adapted to extract light from the light guide article 700 through side 716 of the second light guide 704. First light guide 702 includes opposing first and second ends 718 and 719, and includes sides comprising one or more flat surfaces 737. Third light guide 705 includes opposing first and second ends 728 and 729, and includes sides comprising one or more flat surfaces 739. One or both of first and third light guides 702 and 705 may include light extractors adapted to extract light from the light guide article 700 through one or more of the surfaces 737 and 739. In some embodiments, such light extractors are adapted to illuminate one or more indicia at one or more of the surfaces 737 and 739.

One or more light sources may be disposed proximate one or more of the ends 712, 713, 718, 719, 728, and 729. In some embodiments, light sources are disposed proximate one or both of the first and second ends 718 and 719 of the second light guide 704, and light sources are disposed proximate one or both of the first and second ends 728 and 729 of the third light guides. The second light guide 704 may receive light substantially only from the first and third light guides 702 and 705 and not from any light sources disposed proximate the first and second ends 712 and 713 of the second light guide 704.

Figure 8A:
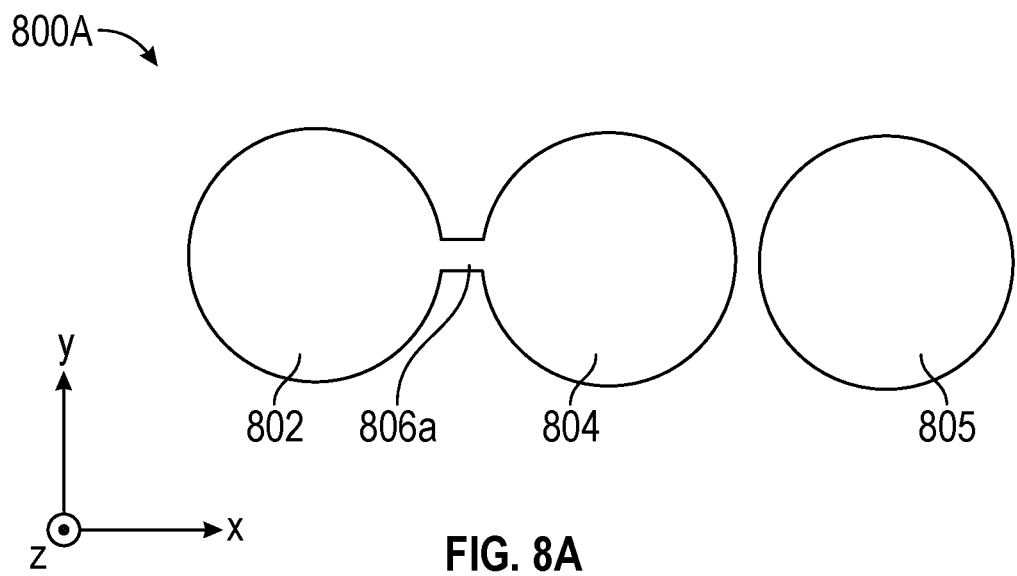
FIGS. 8A-10 are schematic cross-sectional views of light guide assemblies.

FIG. 8A is a cross-sectional view of light guide article 800A, which may correspond to any of the light guide articles described elsewhere herein, including first, second and third light guides 802, 804 and 805 and including optical coupling component 806a disposed between and attached to first and second light guides 802 and 804. A second optical coupling component, which is not visible in the cross-section of FIG. 8A, is disposed between and attached to the second and third light guides 804 and 805. The first, second and third light guides 802, 804 and 805 may have the same or different cross-sectional shapes and/or the same or different cross-sectional areas. At least one of the first, second and third light guides 802, 804 and 805 may have a substantially circular or a substantially rectangular (e.g., square) cross-section. The optical coupling component 806a may be adapted to symmetrically or asymmetrically couple light between the first and second light guides 802 and 804. In the illustrated embodiment, optical coupling component 806a is symmetrically disposed between the first and second light guides 802 and 804 with a thickness (y-dimension) that does not vary (the thickness is constant or substantially constant) in the width direction (x-direction) and symmetrically couples light between the first and second light guides 802 and 804. The optical coupling component 806a may be continuous (e.g., corresponding to optical coupling component 106 of FIG. 1) or discontinuous (e.g., corresponding to optical component 306 of FIG. 3) in the length direction (z-direction). The optical coupling component 806a may define one or more locations (e.g., corresponding to locations 733 of FIG. 7) adapted to prevent optical coupling between the first and second light guides 802 and 804. One or more of first, second and third light guides 802, 804 and 805 may include a light extractor configured to extract light through a side of the light guides as described elsewhere herein.

In some embodiments, the optical coupling components of the present description may include a color selective filter. Such filters can be included to tune the color of the light output and provide, for example, different colors for the illumination light output and light output from indicia. The filters may be used with same or different colored light sources. For example, one or both of the optical coupling components may contain a color selective dye. This can be formed by coextruding first and second light guides 802 and 804 and optical coupling component 806a with an optically clear polymer coextruded to form the first and second light guides 802 and 804 and a dyed polymer coextruded to form the optical coupling component 806a. In some embodiments, the color selective filter may be or may include a polymeric multilayer optical film. Suitable polymeric multilayer optical films include those having alternating high and low refractive index layers having appropriate thickness to reflect light of certain wavelengths through constructive interference. Such polymeric multilayer optical films are generally described in U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.), for example. Polymeric multilayer optical film can be included in an optical coupling component disposed between two light guides by attaching a strip of the multilayer optical film between the two light guides using optically clear adhesives between the multilayer optical film and each of the two light guides, for example.

Figure 8B:
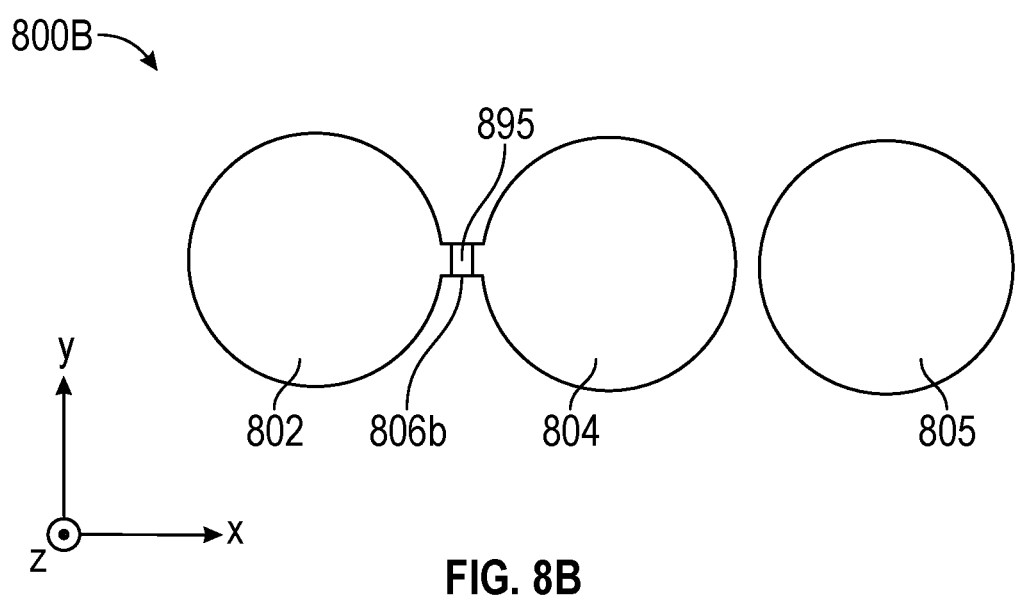

FIG. 8B is a cross-sectional view of light guide article 800B which corresponds to light guide article 800A except that optical coupling component 806a has been replaced with optical coupling component 806b which include a color selective filter 895, which may be any of the color selective filters described elsewhere herein. For example, color selective filter 895 may be a dyed polymer or a polymeric multilayer optical film.

Figure 8C:
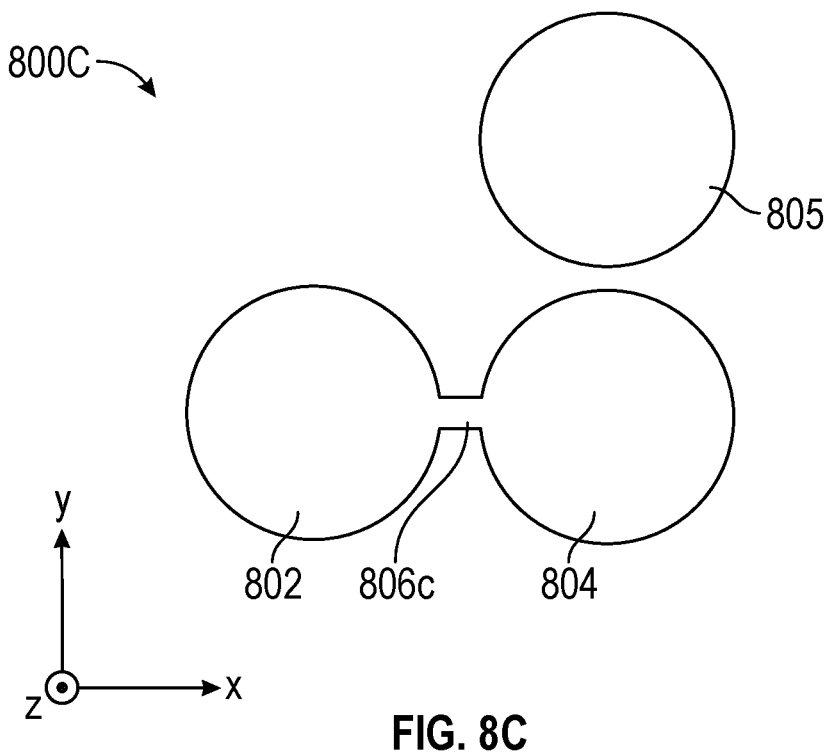

The first, second and third light guides of the light guide assemblies or articles of the present description may be arranged on a plane or may have a non-planar arrangement. For example, in a cross-section through the article, a center of the first, second and third light guides may have a triangular arrangement (e.g., the centers may be on the vertices of an isosceles triangle or an equilateral triangle). FIG. 8C is a cross-sectional view of light guide article 800C which corresponds to light guide article 800A except that the third light guide 805 is not directly across the second light guide 804 from the first light guide 802. The centers of the first, second and third light guides 802, 804 and 805 are disposed on the vertices of a right isosceles triangle in the illustrated embodiment.

Figure 9:
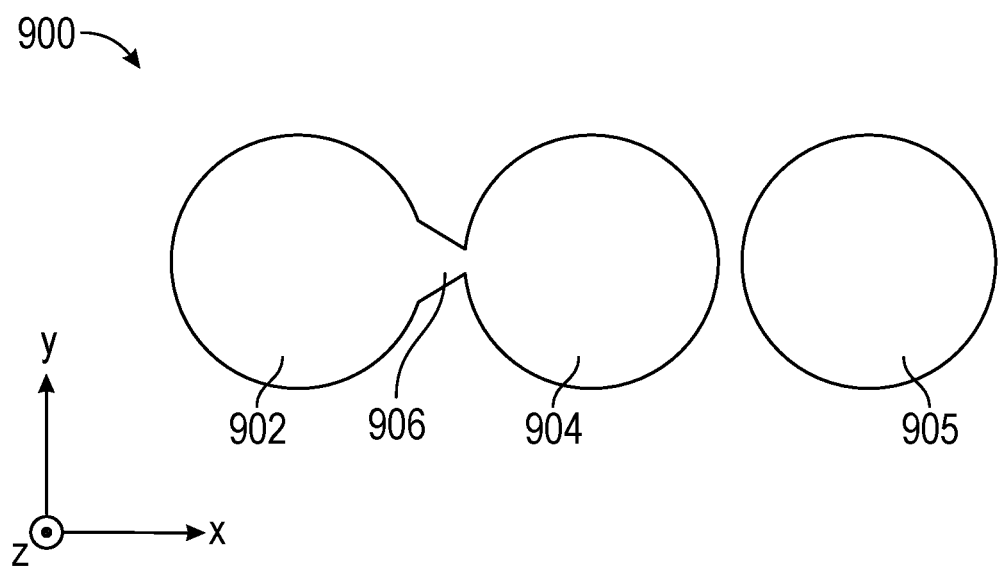

FIG. 9 is a cross-sectional view of light guide article 900 including first, second and third light guides 902, 904 and 905, and including optical coupling component 906 disposed between and attached to first and second light guides 902 and 904. A second optical coupling component, which is not visible in the cross-section of FIG. 9, is disposed between and attached to the second and third light guides 904 and 905. The first, second and third light guides 902, 904 and 905 may have the same or different cross-sectional shapes and/or the same or different cross-sectional areas. The optical coupling component 906 is adapted to asymmetrically couple light between the first and second light guides 902 and 904. The optical coupling component 906 has a height (y-dimension) that varies with the width direction (x-direction). Alternatively or in addition, the optical coupling component 906 may have a plurality of regions (e.g., corresponding to regions 306a in FIG. 3) which have a length (in the z-direction) that varies in the width (x-) direction. The optical coupling component 906 may be continuous (e.g., corresponding to optical coupling component 106 of FIG. 1) or discontinuous (e.g., corresponding to optical component 306 of FIG. 3) in the length direction (z-direction). The optical coupling component 906 may include one or more locations (e.g., corresponding to locations 733 of FIG. 7) adapted to prevent optical coupling between the first and second light guides 902 and 904. One or more of the first, second and third light guides 902, 904 and 905 may include a light extractor configured to extract light through a side of the light guides as described elsewhere herein.

The optical coupling components of the present description may provide an optical coupling between adjacent light guides that is primarily a function of at least one of a first amplitude of a first light propagating in one of the light guides and a second amplitude of a second light propagating in the other of the light guides. The optical coupling components may have a length of at least 1 cm, or at least 3 cm, or at least 10 cm, for example. The optical coupling may be substantially independent of both a first phase of the first light and a second phase of the second light. The optical coupling may, however, depend to some degree on the phases even though the coupling may be primarily determined by the amplitudes. In some embodiments, the optical coupling is a function of at least one of the first phase and the second phase.

Figure 10:
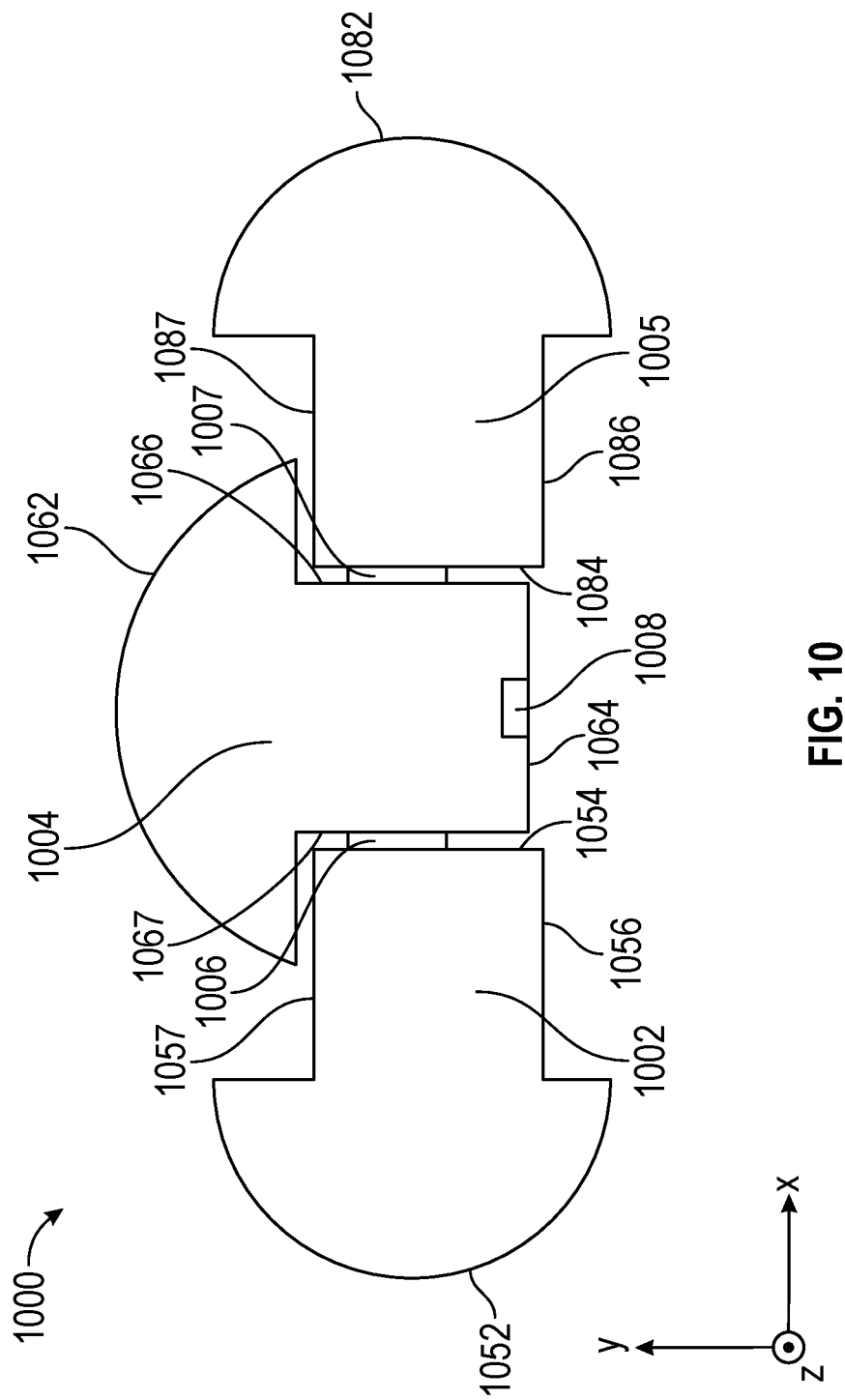

The light guides of the light guide assemblies of the present description may have any useful cross-section. In some embodiments, one or more of the light guides includes both flat and curved surfaces. FIG. 10 is a cross-sectional view of light guide assembly 1000 including first, second and third light guides 1002, 1004 and 1005 and including first optical coupling component 1006 disposed between and attached to first and second light guides 1002 and 1004 and second optical coupling component 1007 disposed between and attached to the second and third light guides 1004 and 1005. The first and second optical coupling components 1006 and 1007 at most partially overlap. The cross-section of FIG. 10 is in a region along the length of the article 1000 where the first and second optical coupling components 1006 and 1007 overlap. The first, second and third light guides 1002, 1004 and 1005 can made as generally described in U.S. Pat. No. 8,684,578 (Rudek et al.) and U.S. Pat. No. 8,459,854 (Rudek et al.). First optical coupling component 1006 is adapted to couple light between the first and second light guides 1002 and 1004, and similarly, second optical coupling component 1007 is adapted to couple light between the second and third light guides 1004 and 1005. First light guide 1002 includes a curved side 1052, an opposing flat side 1054, and first and second joining sides 1056 and 1057 connecting the curved side 1052 and the flat side 1054. Second light guide 1004 includes a curved light exit side 1062, a light directing side 1064, which is flat in the illustrated embodiment, and first and second joining sides 1066 and 1067 connecting the curved side 1062 and the light directing side 1064. Third light guide 1005 includes a curved side 1082, an opposing flat side 1084, and first and second joining sides 1086 and 1087 connecting the curved side 1082 and the flat side 1084. First optical coupling component 1006, which may correspond to any of the optical coupling components described elsewhere herein, is attached to the flat side 1054 and is attached to the joining side 1067. Second optical coupling component 1007, which may correspond to any of the optical coupling components described elsewhere herein, is attached to the flat side 1084 and is attached to the joining side 1066. Second light guide 1004 includes a light extractor 1008, which may correspond to any of the light extractors described elsewhere herein, configured to extract light from the light guide article 1000 though the curved light exit side 1062 of the second light guide 1004.

Light guide assemblies related to the light guide assemblies of the present description are described in U.S. Provisional Application No. 62/202,373 filed Aug. 7, 2015 which is hereby incorporated herein by reference to the extent that it does not contradict the present description.

The light guide assemblies of the present description may be made from an optically clear polymeric material or a glass, for example. Suitable polymeric materials include acrylates such as polymethyl methacrylate (PMMA), polycarbonate, and polyurethane, for example. Light guides or light guide assemblies having light extracting features can be made by injection molding, for example. Alternatively, the light guides or light guide assemblies can be made by first forming the light guides or light guide assemblies without light extracting features and then creating the light extracting features through a subsequent processing step. The light guides or light guide assemblies can be formed without light extractors, by extrusion or by molding, for example. The light extractors can then be formed by etching, laser ablation, or embossing, for example. The optical coupling components can be formed by first extruding continuous elements between the adjacent light guides, and the removing portions (e.g., by laser ablation or etching) or otherwise modifying the continuous elements to form the optical coupling components.

Figure 11:
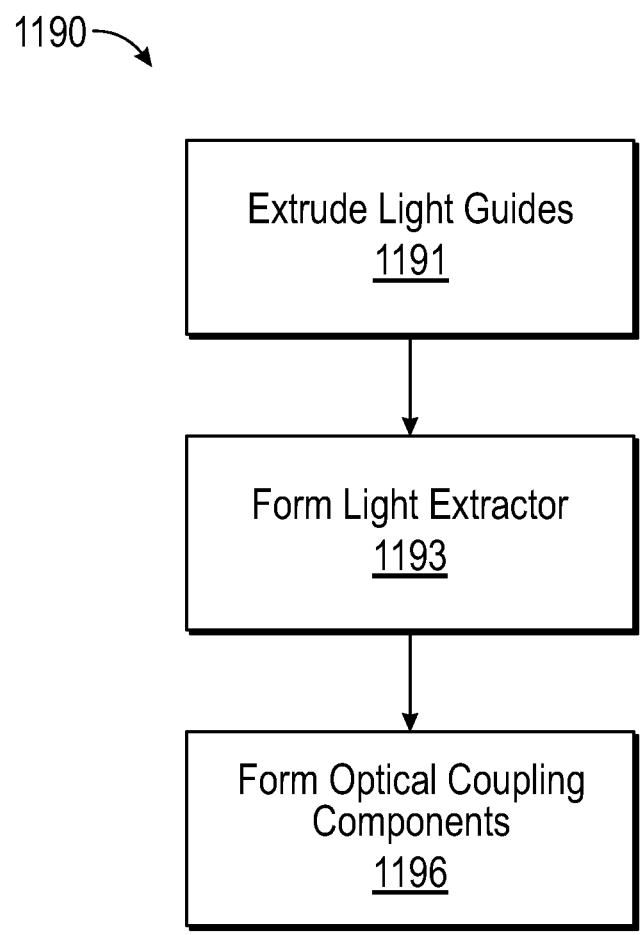
FIG. 11 is a flow chart illustrating a process for making light guide assemblies.

A method 1190 of making a light guide article is schematically illustrated in FIG. 11. In step 1191, a monolithic article comprising first, second and third light guides is extruded with a first element disposed between and integrally attached to the first and second light guides and a second element disposed between and integrally attached to the second and third light guides. In step 1193, the light extractor on the second light guide is formed (e.g., via laser ablation). In step 1196, portions of the first and second elements are removed (e.g., via laser ablation) to form first and second optical coupling components that, at most, partially overlap. The step 1191 is first performed, followed by either one of steps 1193 or 1196, and then followed by the other of 1193 and 1196. Alternatively, steps 1193 and 1196 may be performed simultaneously or at overlapping times.

Example

A light guide article as illustrated in FIG. 10 was constructed using three mushroom rods having curved portions with diameters of 7 mm. The rods were made by extrusion of PMMA (POQ66 available from Evonik Performance Materials GnbH, Essen, Germany) and had a refractive index of 1.49 (as used herein, refractive index refers to the refractive index determined at a wavelength of 589 nm (sodium D line) unless specified differently). Light extractor 1008 included a plurality of triplets of notches as illustrated in FIG. 5 with a pitch, P, of 9 mm between triplets and a spacing, g, of 1.5 mm between the notches within the triplets. The notches had a width, W, of 2.6 mm, an included angle of about 100 degrees, and a depth of about 129 micrometers. The notches were formed via laser ablation. The first and second light guides 1002 and 1004 were attached together using a first optically clear adhesive having a refractive index of about 1.47-1.49, a thickness of about 10 mils (250 micrometers), and a width of about 1.5 mm which extended along about half of the length of the light guides. Similarly, the second and third light guides 1004 and 1005 were attached together using a second optically clear adhesive having the same geometry and refractive index as the first optically clear adhesive but extending along about the other half of the length of the light guides. The first optically clear adhesive formed the first optical coupling component 1006 and the second optically clear adhesive formed the second optical coupling component 1007. The length, $L_A$, of the light guide article was about 1.2 m.

Figure 12:
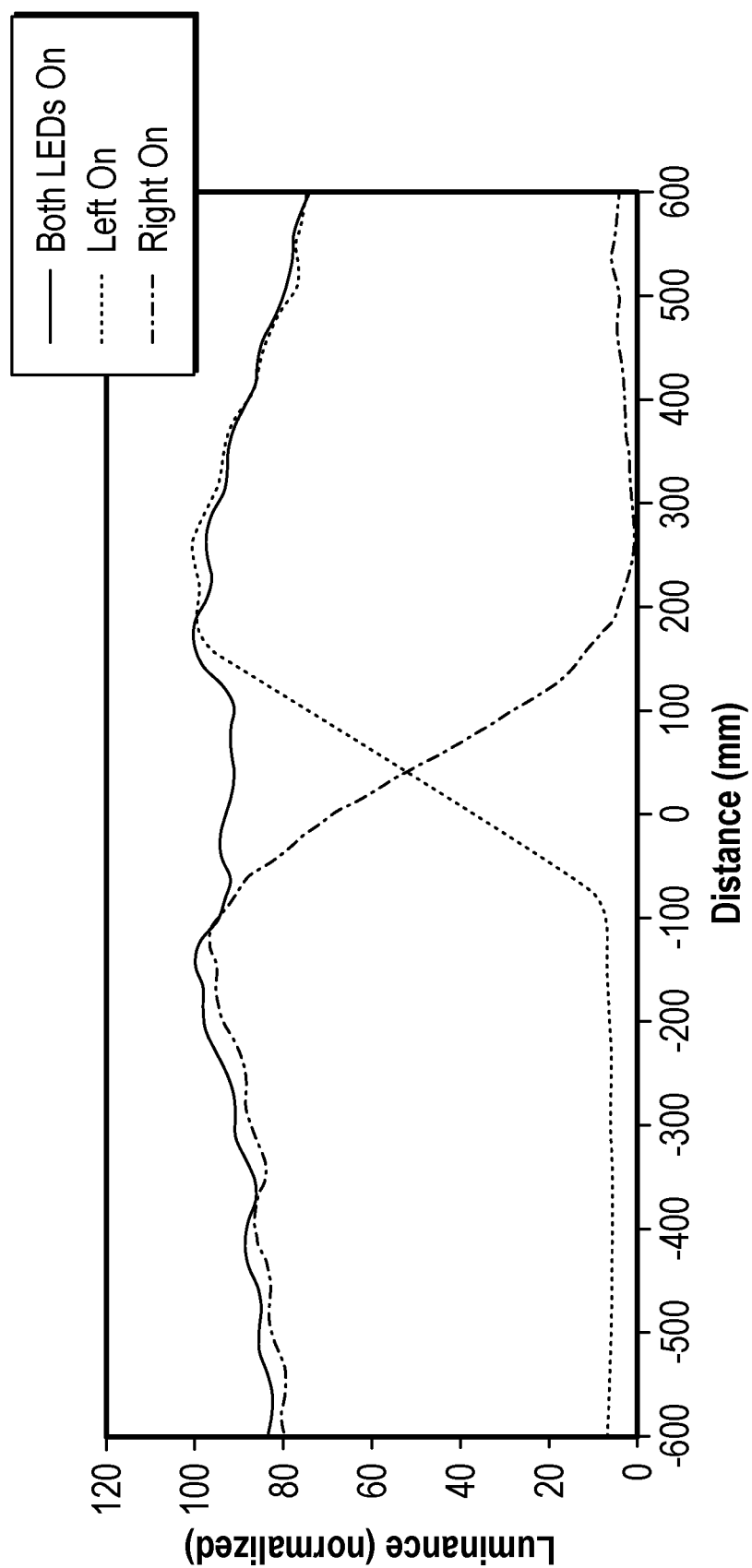
FIG. 12 is a graph of luminance as a function of position along a length of a light guide.

A first light emitting diode (LED) (OSRAM CNSM available from OSRAM Opto Semiconductors GmbH, Regensburg, Germany) were used to inject light into one end of the first light guide 1002 and a second LED (also an OSRAM CNSM) was used to inject light into an opposite end of the third light guide 1005. The uniformity of light outputs through curved light exit side 1062 of the second light guide 1004 was determined for one or both of the LEDs illuminated and are shown in FIG. 12 which shows the luminance as a function of location in mm along a length of the light guide article 1000 from a first end (at −600 mm) to a second end (at 600 mm) of the article 1000. The luminance was measured using a camera (PROMETRIC PM Series Imaging Colorimeter (model: PM-1613F-1), available from Radiant Vision Systems, LLC, Redmond, Wash.) positioned a distance of 2.5 meters from the article 1000 and aligned approximately at the center of the length of the article 1000. The camera determined a luminance as a function of location. The measured luminance was normalized to a maximum value of 100 and plotted versus location along the length of the article in FIG. 12. It can be seen in FIG. 12, that the luminance varied by no more than about 20 percent ((100−80)/100 times 100 percent) over a portion of the article guide from −600 mm to −100 mm and that the luminance over a portion of the article from 200 mm to 600 mm was less than 10 percent of the maximum luminance when the right LED was turned on and the left LED was turned off.

The following is a list of exemplary embodiments of the present description.

Embodiment 1 is an article comprising first, second and third light guides, a first optical coupling component disposed between and attached to the first and second light guides and adapted to couple light between the first and second light guides, and a second optical coupling component disposed between and attached to the second and third light guides and adapted to couple light between the second and third light guides, wherein the first light guide, the second light guide and the first optical coupling component are coextensive over a first region of the article extending along a first portion of a length of the article, the first portion having a length between about 20 percent and 80 percent of the length of the article, wherein the second light guide, the third light guide and the second optical coupling component are coextensive over a different second region of the article extending along a second portion of the length of the article, the second portion having a length between about 20 percent and 80 percent of the length of the article, the second portion of the length at most partially coextensive with the first portion of the length, and wherein the second light guide includes a light extractor configured to extract light from the article through a side of the second light guide.

Embodiment 2 is the article of embodiment 1, wherein there is substantially no overlap of the first and second portions of the length.

Embodiment 3 is the article of embodiment 1, wherein the first and second portions of the length are coextensive in an overlap region of the article.

Embodiment 4 is the article of embodiment 3, wherein a length of the overlap region is less than half a length of the first portion.

Embodiment 5 is the article of embodiment 1, wherein the first, second and third light guides each have a first end disposed adjacent a first end of the article and a second end disposed adjacent an opposite second end of the article, the article includes a first light source disposed to inject light into the first end of the first light guide, and a second light source disposed to inject light into the second end of the third light guide.

Embodiment 6 is the article of embodiment 5, wherein light from the first light source is substantially uniformly extracted primarily from a first portion of the second light guide adjacent the second end of the second light guide.

Embodiment 7 is the article of embodiment 6, wherein light from the second light source is substantially uniformly extracted primarily from a second portion of the second light guide disposed between the first portion of the second light guide and the first end of the second light guide.

Embodiment 8 is the article of embodiment 7, wherein each of the first and second portions of the second light guide have a length of at least 30% of a length of the second light guide.

Embodiment 9 is the article of embodiment 7, where the first portion of the second light guide is substantially coextensive with the first optical coupling component and the second portion of the second light guide is substantially coextensive with the second optical coupling component.

Embodiment 10 is the article of embodiment 7, wherein the light from the first light source that is extracted from the second light guide has a total luminous energy, no more than 40 percent of the total luminous energy being extracted from the second portion of the second light guide.

Embodiment 11 is the article of embodiment 7, wherein the light from the first light source that is extracted from the second light guide has a total luminous energy, no more than 30 percent of the total luminous energy being extracted from the second portion of the second light guide.

Embodiment 12 is the article of embodiment 7, wherein the light from the first light source that is extracted from the second light guide has a total luminous energy, no more than 20 percent of the total luminous energy being extracted from the second portion of the second light guide.

Embodiment 13 is the article of embodiment 7, wherein the light from the first light source that is extracted from the second light guide has a total luminous energy, no more than 10 percent of the total luminous energy being extracted from the second portion of the second light guide.

Embodiment 14 is the article of embodiment 6, wherein the light from the first light source extracted from the first portion of the second light guide has a luminance that varies by less than 40 percent along the length of the first portion of the second light guide.

Embodiment 15 is the article of embodiment 6, wherein the light from the first light source extracted from the first portion of the second light guide has a luminance that varies by less than 30 percent along the length of the first portion of the second light guide.

Embodiment 16 is the article of embodiment 6, wherein the light from the first light source extracted from the first portion of the second light guide has a luminance that varies by less than 20 percent along the length of the first portion of the second light guide.

Embodiment 17 is the article of embodiment 6, wherein the light from the first light source extracted from the first portion of the second light guide has a luminance that varies by less than 10 percent along the length of the first portion of the second light guide.

Embodiment 18 is the article of embodiment 5, wherein light from the first light source has a first color and light from the second light source has a different second color.

Embodiment 19 is the article of embodiment 18, wherein the first and second portions of the length of the article are coextensive in an overlap region of the article.

Embodiment 20 is the article of embodiment 19, wherein the article is configured to extract a third color different from the first and second colors from the overlap region.

Embodiment 21 is the article of embodiment 5, wherein the article is configured such that the first and second light sources can be independently controlled.

Embodiment 22 is the article of embodiment 5, wherein the article comprises a controller adapted to independently control the first and second light source.

Embodiment 23 is the article of embodiment 22, wherein the controller includes a plurality of different modes, the light extracted from the article differing in the different modes.

Embodiment 24 is the article of embodiment 23, wherein in at least one of the modes, the controller is adapted to alternately turn on and off the first and second light sources.

Embodiment 25 is the article of embodiment 1 being monolithic.

Embodiment 26 is the article of embodiment 1, wherein the light extractor is disposed at least partially in each of the first and second regions.

Embodiment 27 is the article of embodiment 1, wherein the first optical coupling component is adapted to provide a first optical coupling that is primarily a function of at least one of a first amplitude of a first light propagating in the first light guide and a second amplitude of a second light propagating in the second light guide.

Embodiment 28 is the article of embodiment 27, wherein the second optical coupling component is adapted to provide a second optical coupling that is primarily a function of at least one of the second amplitude and a third amplitude of a third light propagating in the third light guide.

Embodiment 29 is the article of embodiment 1, wherein the first optical coupling component has at least one location along a length of the first optical coupling component adapted to prevent optical coupling.

Embodiment 30 is the article of embodiment 29, wherein the second optical coupling component has at least one location along a length of the second optical coupling component adapted to prevent optical coupling.

Embodiment 31 is the article of embodiment 1, wherein the first optical coupling component has a length of at least 1 cm.

Embodiment 32 is the article of embodiment 31, wherein the second optical coupling component has a length of at least 1 cm.

Embodiment 33 is the article of embodiment 1, wherein each of the first and second optical coupling components have a length of at least 10 cm.

Embodiment 34 is the article of embodiment 1, wherein at least one of the first, second and third light guides has a curved side an opposing flat side.

Embodiment 35 is the article of embodiment 1, wherein the second light guide has a curved light exit side and an opposing flat light redirecting side.

Embodiment 36 is the article of embodiment 1, wherein at least one of the first, second and third light guides has a substantially circular cross-section.

Embodiment 37 is the article of embodiment 1, wherein at least one of the first, second and third light guides has a substantially rectangular cross-section.

Embodiment 38 is a method of making the article of embodiment 1, comprising injection molding the article.

Embodiment 39 is a method of making the article of embodiment 1, comprising:
extruding a monolithic assembly comprising the first, second and third light guides; and forming the light extractor in the second light guide.

Embodiment 40 is the method of embodiment 39, wherein the forming step comprises laser ablating a plurality of discrete spaced apart notches into a surface of the second light guide.

Embodiment 41 is the method of embodiment 39, wherein the extruding step comprises extruding a first element disposed between and attached to the first and second light guides and a second element disposed between and attached to the second and third light guides.

Embodiment 42 is the method of embodiment 41, further comprising removing a portion of the first element to form the first optical coupling component and removing a portion of the second element to form the second optical coupling component.

Embodiment 43 is the method of embodiment 41, further comprising laser ablating the first element to form the first optical coupling component and laser ablating the second element to form the second optical coupling component.

Embodiment 44 is an optical system comprising:
first, second and third light guides, the first, second and third light guides each having a first end disposed adjacent a first end of the optical system and a second end disposed adjacent an opposite second end of the optical system, the second light guide including a light extractor configured to extract light from the optical system through a side of the second light guide;
a first optical coupling component disposed between and attached to the first and second light guides and adapted to couple light between the first and second light guides;
a second optical coupling component disposed between and attached to the second and third light guides and adapted to couple light between the second and third light guides;
a first light source disposed to inject light into the first end of the first light guide; and
a second light source disposed to inject light into the second end of the third light guide, wherein the optical system is configured such that light from the first light source is substantially uniformly extracted primarily from a first portion of the second light guide adjacent the second end of the second light guide, and light from the second light source is substantially uniformly extracted primarily from a second portion of the second light guide disposed between the first portion of the second light guide and the first end of the second light guide and at most partially overlapping with the first portion of the second light guide, and
wherein each of the first and second portions of the second light guide have a length of at least 20 percent of a length of the second light guide.

Embodiment 45 is the optical system of embodiment 44, wherein the first portion of the second light guide is substantially coextensive with the first optical coupling component.

Embodiment 46 is the optical system of embodiment 44, wherein the second portion of the second light guide is substantially coextensive with the second optical coupling component.

Embodiment 47 is the optical system of embodiment 44, wherein the first and second portions of the second light guide are non-overlapping.

Embodiment 48 is the optical system of embodiment 44, wherein the first and second portions of the length are coextensive in an overlap region of the optical system.

Embodiment 49 is the optical system of embodiment 48, wherein a length of the overlap region is less than half a length of the first portion.

Embodiment 50 is the optical system of embodiment 48, wherein a length of the overlap region is less than 30 percent of a length of the first portion.

Embodiment 51 is the optical system of embodiment 48, wherein a length of the overlap region is less than 10 percent of a length of the first portion.

Embodiment 52 is the optical system of embodiment 44, wherein each of the first and second portions of the second light guide have a length between about 30 percent and about 70 percent of the length of the second light guide.

Embodiment 53 is the optical system of embodiment 44, wherein each of the first and second portions of the second light guide have a length between about 40 percent and about 60 percent of the length of the second light guide.

Embodiment 54 is the optical system of embodiment 44, wherein the light from the first light source extracted from the first portion of the second light guide has a luminance that varies by less than 40 percent along a length of the first portion of the second light guide.

Embodiment 55 is the optical system of embodiment 44, wherein the light from the first light source extracted from the first portion of the second light guide has a luminance that varies by less than 30 percent along a length of the first portion of the second light guide.

Embodiment 56 is the optical system of embodiment 44, wherein the light from the first light source extracted from the first portion of the second light guide has a luminance that varies by less than 20 percent along a length of the first portion of the second light guide.

Embodiment 57 is the optical system of embodiment 44, wherein the light from the first light source extracted from the first portion of the second light guide has a luminance that varies by less than 10 percent along a length of the first portion of the second light guide.

Embodiment 58 is the optical system of embodiment 44, wherein a monolithic light guide article comprises the first, second and third light guides, and the first and second optical coupling components.

Embodiment 59 is the optical system of embodiment 44, wherein the light extractor is disposed at least partially in each of the first and second regions.

Embodiment 60 is the optical system of embodiment 44, wherein the first optical coupling component is adapted to provide a first optical coupling that is primarily a function of at least one of a first amplitude of a first light propagating in the first light guide and a second amplitude of a second light propagating in the second light guide.

Embodiment 61 is the optical system of embodiment 60, wherein the second optical coupling component is adapted to provide a second optical coupling that is primarily a function of at least one of the second amplitude and a third amplitude of a third light propagating in the third light guide.

Embodiment 62 is the optical system of embodiment 44, wherein the first optical coupling component has at least one location along a length of the first optical coupling component adapted to prevent optical coupling.

Embodiment 63 is the optical system of embodiment 62, wherein the second optical coupling component has at least one location along a length of the second optical coupling component adapted to prevent optical coupling.

Embodiment 64 is the optical system of embodiment 44, wherein the first optical coupling component has a length of at least 1 cm.

Embodiment 65 is the optical system of embodiment 44, wherein the second optical coupling component has a length of at least 1 cm.

Embodiment 66 is the optical system of embodiment 44, wherein each of the first and second optical coupling components have a length of at least 10 cm.

Embodiment 67 is a monolithic light pipe extending along a length of the light pipe between opposing first and second end faces and comprising non-overlapping first and second portions, each portion having a length of at least 20 percent of a length of the monolithic light pipe, the light pipe comprising a first optical coupling component disposed between the first and second end faces configured to couple light into the light pipe, the light pipe having a different second optical coupling component between the first and second end faces configured to couple light into the light pipe, wherein the light pipe is configured such that that light coupled into the light pipe through the first optical coupling component is substantially uniformly extracted primarily from the first portion of the light pipe and light coupled into the light pipe through the second optical coupling component is substantially uniformly extracted primarily from the second portion of the light pipe.

Embodiment 68 is the monolithic light pipe of embodiment 67, wherein the first optical coupling component is configured to couple light into the monolithic light pipe from a first light guide.

Embodiment 69 is the monolithic light pipe of embodiment 68, wherein the second optical coupling component is configured to couple light into the monolithic light pipe from a second light guide.

Embodiment 70 is the monolithic light pipe of embodiment 67, wherein the first optical coupling component extends at least along the first portion of the light pipe.

Embodiment 71 is the monolithic light pipe of embodiment 70, wherein the second optical coupling component extends at least along the second portion of the light pipe.

Embodiment 72 is the monolithic light pipe of embodiment 67, wherein each of the first and second portions have a length of about 30 percent to about 70 percent of the length of the monolithic light pipe.

Embodiment 73 is the monolithic light pipe of embodiment 67, wherein each of the first and second portions have a length of about 40 percent to about 60 percent of the length of the monolithic light pipe.

Embodiment 74 is the monolithic light pipe of embodiment 67, further comprising a light extractor configured to extract light from the light pipe through a side of the light pipe.

Embodiment 75 is the monolithic light pipe of embodiment 74, wherein the light extractor is disposed at least partially in each of the first and second regions.

Embodiment 76 is an article comprising:
the monolithic light pipe of embodiment 67;
a first light guide, wherein the first optical coupling component is disposed between the first light guide and the light pipe and is adapted to couple light between the first light guide and the light pipe;
a second light guide, wherein the second optical coupling component is disposed between the second light guide and the light pipe and is adapted to couple light between the second light guide and the light pipe.

Embodiment 77 is the article of embodiment 76 being monolithic.

Embodiment 78 is an optical system comprising the article of embodiment 76, a first light source configured to inject light into an end face of the first light guide, and a second light source configured to inject light into an end face of the second light guide.

Embodiment 79 is the optical system of embodiment 78, wherein the first and second light sources are disposed at opposite ends of the article.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An article comprising first, second and third light guides, the first, second and third light guides each having a first end disposed adjacent a first end of the article and a second end disposed adjacent an opposite second end of article, a first optical coupling component disposed between and attached to the first and second light guides and adapted to couple light between the first and second light guides, and a second optical coupling component disposed between and attached to the second and third light guides and adapted to couple light between the second and third light guides,
wherein the first light guide, the second light guide and the first optical coupling component are coextensive over a first region of the article extending along a first portion of a length of the article, the first portion having a length between about 20 percent and 80 percent of the length of the article,
wherein the second light guide, the third light guide and the second optical coupling component are coextensive over a different second region of the article extending along a second portion of the length of the article, the second portion having a length between about 20 percent and 80 percent of the length of the article, the second portion of the length at most partially coextensive with the first portion of the length, and
wherein the second light guide includes a light extractor configured to extract light from the article through a side of the second light guide.

2. The article of claim 1, wherein there is substantially no overlap of the first and second portions of the length.

3. The article of claim 1, wherein the first and second portions of the length are coextensive in an overlap region of the article.

4. The article of claim 3, wherein a length of the overlap region is less than half a length of the first portion.

5. The article of claim 1, wherein the first, second and third light guides each have a first end disposed adjacent a first end of the article and a second end disposed adjacent an opposite second end of the article, the article includes a first light source disposed to inject light into the first end of the first light guide, and a second light source disposed to inject light into the second end of the third light guide.

6. The article of claim 5, wherein light from the first light source is substantially uniformly extracted primarily from a first portion of the second light guide adjacent the second end of the second light guide.

7. The article of claim 6, wherein light from the second light source is substantially uniformly extracted primarily from a second portion of the second light guide disposed between the first portion of the second light guide and the first end of the second light guide.

8. The article of claim 5, wherein the article is configured such that the first and second light sources can be independently controlled.

9. The article of claim 1, wherein the light extractor is disposed at least partially in each of the first and second regions.

10. The article of claim 1, wherein the first optical coupling component has at least one location along a length of the first optical coupling component adapted to prevent optical coupling.

11. The article of claim 10, wherein the second optical coupling component has at least one location along a length of the second optical coupling component adapted to prevent optical coupling.

12. The article of claim 1, wherein at least one of the first, second and third light guides has a substantially circular cross-section.

13. A method of making the article of claim 1, comprising:
extruding a monolithic assembly comprising the first, second and third light guides; and
forming the light extractor in the second light guide, wherein the extruding step comprises extruding a first element disposed between and attached to the first and second light guides and a second element disposed between and attached to the second and third light guides, wherein the method further comprises removing a portion of the first element to form the first optical coupling component and removing a portion of the second element to form the second optical coupling component.

14. An optical system comprising:
first, second and third light guides, the first, second and third light guides each having a first end disposed adjacent a first end of the optical system and a second end disposed adjacent an opposite second end of the optical system, the second light guide including a light extractor configured to extract light from the optical system through a side of the second light guide;
a first optical coupling component disposed between and attached to the first and second light guides and adapted to couple light between the first and second light guides;
a second optical coupling component disposed between and attached to the second and third light guides and adapted to couple light between the second and third light guides;
a first light source disposed to inject light into the first end of the first light guide; and
a second light source disposed to inject light into the second end of the third light guide,
wherein the optical system is configured such that light from the first light source is substantially uniformly extracted primarily from a first portion of the second light guide adjacent the second end of the second light guide, and light from the second light source is substantially uniformly extracted primarily from a second portion of the second light guide disposed between the first portion of the second light guide and the first end of the second light guide and at most partially overlapping with the first portion of the second light guide, and
wherein each of the first and second portions of the second light guide have a length of at least 20 percent of a length of the second light guide.

15. The optical system of claim 14, wherein each of the first and second portions of the second light guide have a length between about 30 percent and about 70 percent of the length of the second light guide.

16. The optical system of claim 14, wherein the first optical coupling component has at least one location along a length of the first optical coupling component adapted to prevent optical coupling.

17. The optical system of claim 14, wherein each of the first and second optical coupling components have a length of at least 10 cm.

18. A monolithic light pipe extending along a length of the light pipe between opposing first and second end faces and comprising first and second portions which do not overlap along the length of the light pipe, each portion having a length of at least 20 percent of a length of the monolithic light pipe, the light pipe comprising a first optical coupling component disposed between the first and second end faces configured to couple light into the light pipe, the light pipe having a different second optical coupling component between the first and second end faces configured to couple light into the light pipe, wherein the light pipe is configured such that that light coupled into the light pipe through the first optical coupling component is substantially uniformly extracted primarily from the first portion of the light pipe and light coupled into the light pipe through the second optical coupling component is substantially uniformly extracted primarily from the second portion of the light pipe.

19. The monolithic light pipe of claim 18, wherein the first optical coupling component is configured to couple light into the monolithic light pipe from a first light guide, and wherein the second optical coupling component is configured to couple light into the monolithic light pipe from a second light guide.

20. An article comprising:
the monolithic light pipe of claim 18;
a first light guide, wherein the first optical coupling component is disposed between the first light guide and the light pipe and is adapted to couple light between the first light guide and the light pipe;
a second light guide, wherein the second optical coupling component is disposed between the second light guide and the light pipe and is adapted to couple light between the second light guide and the light pipe.

* * * * *